(12) United States Patent
Furuta (10) Patent No.: US 8,089,451 B2
(45) Date of Patent: Jan. 3, 2012

(54) DISPLAY DEVICE AND ELECTRONIC APPARATUS EQUIPPED WITH THE SAME

(75) Inventor: Koichiro Furuta, Tokyo (JP)

(73) Assignee: Olympus Corporation, Tokyo (JP)

( * ) Notice: Subject to any disclaimer, the term of this patent is extended or adjusted under 35 U.S.C. 154(b) by 354 days.

(21) Appl. No.: 12/504,138

(22) Filed: Jul. 16, 2009

(65) Prior Publication Data

US 2010/0053133 A1    Mar. 4, 2010

(30) Foreign Application Priority Data

Sep. 3, 2008  (JP) ................................. 2008-226068

(51) Int. Cl.
*G09G 3/36* (2006.01)
(52) U.S. Cl. ........ 345/102; 345/207; 345/211; 713/300; 713/320; 713/324
(58) Field of Classification Search .................. 345/102, 345/207, 211; 713/300, 320, 324
See application file for complete search history.

(56) References Cited

U.S. PATENT DOCUMENTS

| | | | |
|---|---|---|---|
| 2005/0002176 A1* | 1/2005 | Cha et al. ........................ 362/31 |
| 2005/0052383 A1* | 3/2005 | Suzuki ............................ 345/87 |
| 2007/0146356 A1* | 6/2007 | Ladouceur ..................... 345/207 |
| 2009/0251587 A1* | 10/2009 | Kim ......................... 348/333.12 |

FOREIGN PATENT DOCUMENTS

| JP | 2000357075 | 12/2000 |
|---|---|---|
| JP | 2006221083 | * 8/2006 |

* cited by examiner

*Primary Examiner* — Lun-Yi Lao
*Assistant Examiner* — Kelly B Hegarty
(74) *Attorney, Agent, or Firm* — Volpe and Koenig, P.C.

(57) ABSTRACT

A display device and an electronic apparatus equipped with such a display device are provided. The display device includes a liquid crystal display that displays an image; normal-illumination LEDs that emit illumination light and a partial-illumination LED that emits illumination light; a light guide unit having a first incidence surface and a second incidence surface, and configured to optically guide the illumination light received by the first incidence surface to the entire surface of the liquid crystal display and to optically guide the illumination light received by the second incidence surface to a predetermined region having the same aspect ratio as the liquid crystal display; and a switch button used for switching the size of the image displayed on the liquid crystal display to the size corresponding to the entire surface or the size corresponding to the predetermined region.

5 Claims, 12 Drawing Sheets

DISPLAY DEVICE AND ELECTRONIC APPARATUS EQUIPPED WITH THE SAME

BACKGROUND OF THE INVENTION

1. Field of the Invention

The present invention relates to display devices and electronic apparatuses that provide improved visibility outdoors.

This application is based on Japanese Patent Application No. 2008-226068, the content of which is incorporated herein by reference.

2. Description of Related Art

Display screens of digital cameras and portable phones can exhibit good visibility when used indoors, but when used outdoors, the sunlight can sometimes reflect off the surface of the display screen, lowering the visibility. In particular, when a cover is provided for protecting the display screen, this problem of lower visibility becomes more obvious since reflections off the front and back surfaces of the cover are added to the reflection off the surface of the display screen.

As a common approach for ensuring good visibility of display screens in an outdoor environment, one known method of making the display screen brighter involves increasing the power of a backlight. However, this method is problematic in that the number of pictures that can be taken or the operating time is significantly reduced due to the increase in the amount of power consumed by the backlight. In the related art, a method of reducing power consumption by reducing the size of a display region in the display screen is employed as a known countermeasure against such a problem. For example, see Japanese Unexamined Patent Applications, Publication Nos. 2006-221083 and 2000-357075.

In the related art mentioned above, a plurality of backlight sources are provided, and on/off control is performed on each of the light sources, so as to illuminate a predetermined region of the display screen. For example, an image can be displayed only in the right half of the display screen by only turning on a light source that illuminates the right half of the display screen, thereby reducing the power consumption.

However, in the related art, although the image can be displayed on the display screen by splitting it in the vertical direction or the horizontal direction, the image cannot be displayed with the same aspect ratio as the display screen. The reason for this is that the display device of the related art is designed such that the light sources are arranged in the vertical direction or the horizontal direction along an edge of a light guide. When light is emitted from the light sources and subsequently received by the light guide, the light repeatedly undergoes total internal reflection in the light guide so as to be uniformly output from an exit surface of the light guide. Therefore, in order to display the image with the same aspect ratio as the display screen, the light incident on the light guide needs to be output only to a predetermined region of the display screen.

BRIEF SUMMARY OF THE INVENTION

In view of the circumstances described above, it is an object of the present invention to provide a display device that can reduce power consumption while displaying an image with the same aspect ratio as the display screen, and to provide an electronic apparatus equipped with such a display device.

In order to achieve the aforementioned object, the present invention provides the following solutions.

A first aspect of the present invention provides a display device that includes a display screen configured to display an image; a first light source configured to emit illumination light and a second light source configured to emit illumination light; a light guide unit having a first incidence surface that receives the illumination light emitted from the first light source and a second incidence surface that receives the illumination light emitted from the second light source, the light guide unit being configured to optically guide the illumination light received by the first incidence surface to an entire surface of the display screen and to optically guide the illumination light received by the second incidence surface to a predetermined region having the same aspect ratio as the display screen; and an image switching unit configured to switch the size of the image displayed on the display screen the size corresponding to the entire surface or the size corresponding to the predetermined region.

According to the first aspect of the present invention, the illumination light emitted from the first light source and subsequently received by the first incidence surface is optically guided to the entire surface of the display screen by the light guide unit, thereby illuminating the entire surface of the display screen. On the other hand, the illumination light emitted from the second light source and subsequently received by the second incidence surface is optically guided by the light guide unit to the predetermined region having the same aspect ratio as the display screen, thereby partially illuminating the display screen. In addition, the size of the image displayed on the display screen is switched to the size of the predetermined region by the image switching unit. Consequently, a normal-size image can be displayed over the entire display screen by full illumination, and a reduced-size image can be displayed in the predetermined region of the display screen by partial illumination so as to reduce the power consumption.

In the aforementioned display device, the second incidence surface may have a recessed shape.

Accordingly, the angle of refraction of the illumination light at the second incidence surface can be made greater than the angle of refraction of the illumination light at the first incidence surface. Thus, the diffusion range of the illumination light incident on the second incidence surface can be reduced, whereby the illumination light can be optically guided to the predetermined region of the display screen.

In the aforementioned display device, a ratio of the predetermined region to the display screen may be smaller than a ratio of the luminance of the second light source to the luminance of the first light source.

Accordingly, the luminance of the predetermined region illuminated by the second light source can be made higher than the luminance of the display screen entirely illuminated by the first light source. For example, supposing that a single first light source and a single second light source having the same level of luminance are provided and the predetermined region has an area equal to a quarter of the area of the display screen, the luminance of the illuminated predetermined region is four times higher than the luminance of the entirely illuminated display screen. Therefore, even when used outdoors, the visibility of the image displayed in the predetermined region can be improved.

The aforementioned display device may further include an external-light detector configured to detect the intensity of external light, and a lighting controller configured to perform on/off control of the first light source and the second light source on the basis of the intensity of external light detected by the external-light detector.

Accordingly, the lighting controller can switch the illumination mode of the display screen between a full illumination mode and a partial illumination mode on the basis of the intensity of external light detected by the external-light detector. In other words, when the intensity of external light is high, the lighting controller selects the partial illumination mode to increase the luminance of the predetermined region, thereby allowing for improved visibility.

A second aspect of the present invention provides an electronic apparatus that includes the aforementioned display device, an image-acquisition device configured to acquire an image of a subject, and a display controller configured to display the image acquired by the image-acquisition device on the display device.

Accordingly, even when this electronic apparatus is used outdoors, an image of a subject can be acquired in a state where good visibility is ensured, without reducing the number of pictures that can be taken or the operating time.

Accordingly, the present invention can achieve the advantage of reducing power consumption while displaying an image with the same aspect ratio as the display screen.

DETAILED DESCRIPTION OF THE INVENTION

An embodiment of the present invention will be described below with reference to the drawings. The description below is directed to an example in which a display device according to the present invention is applied to a digital camera.

Figure 1:
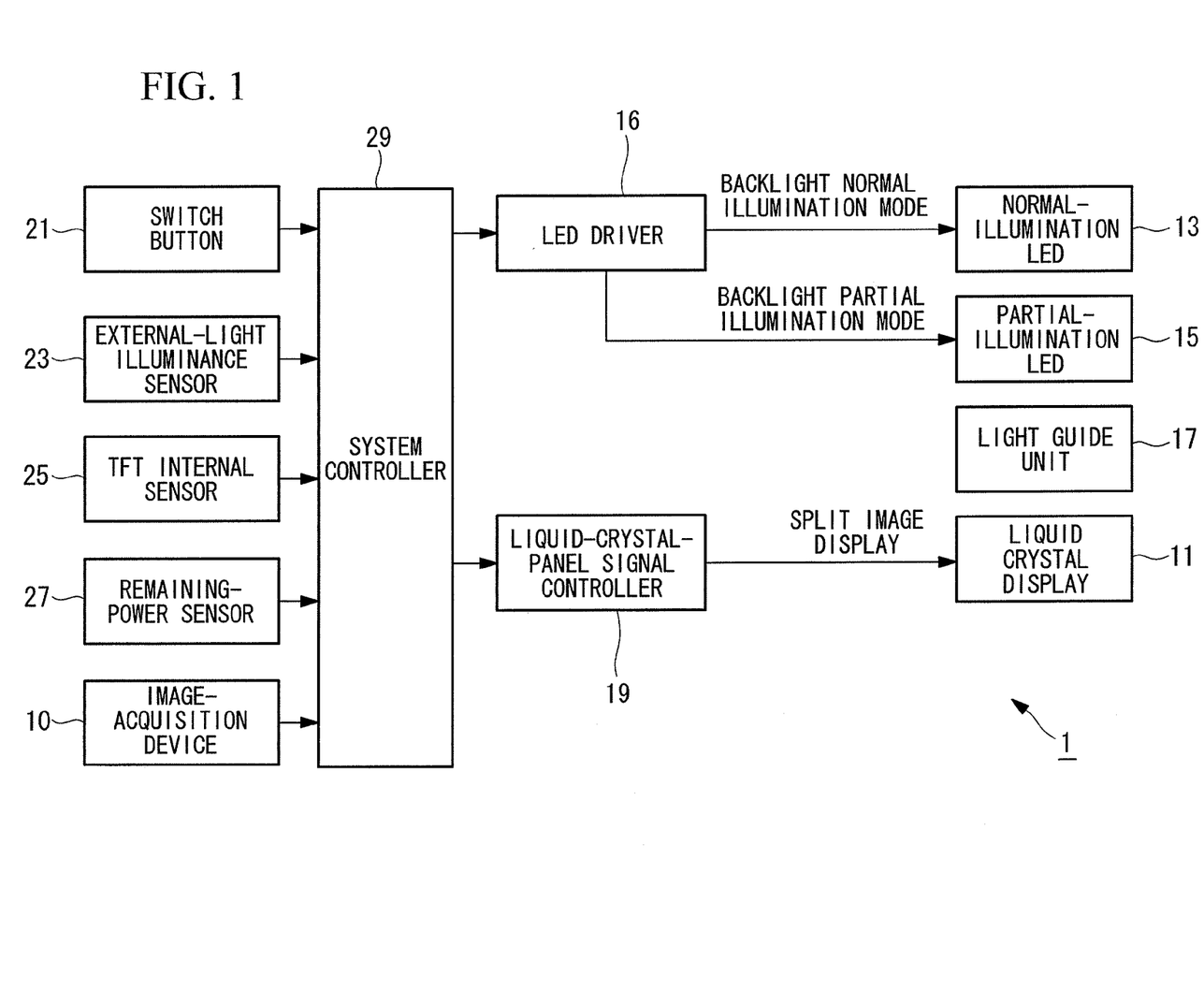
FIG. 1 is a block diagram schematically showing the configuration of a digital camera according to an embodiment of the present invention.

FIG. 1 is a block diagram schematically showing the configuration of a digital camera 1 according to this embodiment.

As shown in FIG. 1, the digital camera 1 according to this embodiment includes an image-acquisition device 10 that acquires an image of a subject, a liquid crystal display (i.e., a display screen) 11 that displays the image acquired by the image-acquisition device 10, normal-illumination light-emitting diodes (LEDs) (i.e., first light sources) 13 that emit illumination light, a partial-illumination LED (i.e., a second light source) 15 that emits illumination light, an LED driver (i.e., a lighting controller) 16 configured to perform on/off control of the normal-illumination LEDs 13 and the partial-illumination LED 15, a light guide unit 17 that optically guides the illumination light emitted from the normal-illumination LEDs 13 and the illumination light emitted from the partial-illumination LED 15 to the liquid crystal display 11, a liquid-crystal-panel signal controller (display controller) 19 that displays a normal-size image or a reduced-size image on the liquid crystal display 11, a switch button (image switching unit) 21 used for switching the size of the image displayed on the liquid crystal display 11, an external-light illuminance sensor (external-light detector) 23 that detects the illuminance of external light, a TFT internal sensor 25 that detects the luminance of the liquid crystal display 11, a remaining-power sensor 27 that detects power remaining in a battery (not shown), and a system controller 29 that individually controls the above-mentioned units.

The image-acquisition device 10 includes an optical unit (not shown), constituted by, for example, a lens for forming an image of a subject, and a charge-coupled device (CCD) (not shown) provided behind the optical unit in the optical-axis direction thereof. The image-acquisition device 10 is configured to convert a signal of the acquired image to a digital signal and output the digital signal to the liquid-crystal-panel signal controller 19 via the system controller 29.

The normal-illumination LEDs 13 and the partial-illumination LED 15 illuminate the liquid crystal display 11 from the back thereof. The liquid crystal display 11 is capable of displaying the image acquired by the image-acquisition device 10 in a size designated by the liquid-crystal-panel signal controller 19.

The LED driver 16 is configured to perform on/off control of the normal-illumination LEDs 13 and the partial-illumination LED 15 on the basis of a command received from the system controller 29 and is also configured to control the luminance of each LED, that is, the value of electric current to be supplied to each LED.

The light guide unit 17 is configured to optically guide the illumination light emitted from the normal-illumination LEDs 13 to the entire surface of the liquid crystal display 11 and also to optically guide the illumination light emitted from the partial-illumination LED 15 to a predetermined region having the same aspect ratio as the liquid crystal display 11.

The construction of the light guide unit 17 will be described in detail below with reference to FIGS. 2 and 3.

Figure 2:
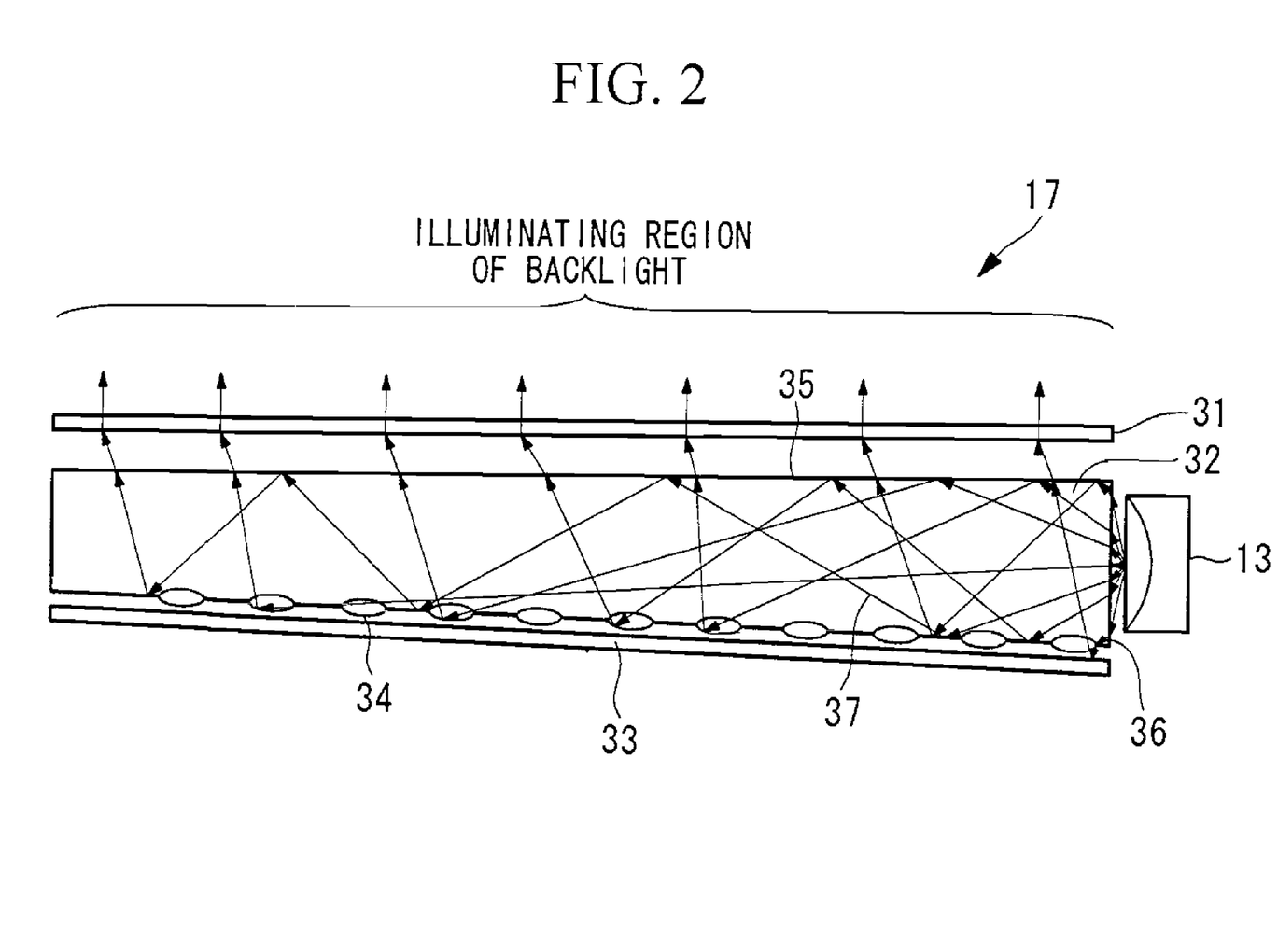
FIG. 2 illustrates the incidence conditions of illumination light emitted from normal-illumination LEDs shown in FIG. 1.

As shown in FIG. 2, the light guide unit 17 includes a first incidence surface 36 that receives illumination light 37 emitted from the normal-illumination LEDs 13, a light guide 32 that optically guides, by internal reflection, the illumination light 37 received through the first incidence surface 36, an optical sheet 31 disposed between the liquid crystal display 11 and the light guide 32, a reflector 33 disposed facing the optical sheet 31 with the light guide 32 therebetween and configured to reflect the illumination light 37 passing through the light guide 32, a plurality of minute optical patterns 34 provided in the light guide 32 and configured to deflect the illumination light 37 internally reflected in the light guide 32, and an exit surface 35 from which the illumination light 37 exits toward the liquid crystal display 11. The light guide unit 17 is configured to output the illumination light 37 received through the first incidence surface 36 onto the entire surface of the liquid crystal display 11.

The minute optical patterns 34 are, for example, prismatic, spherical, hemispherical, conical, stripe-like, lenticular, or hologramic patterns provided on the light guide 32. The shape and number of the minute optical patterns 34 are adjusted so that they change the reflection direction of the illumination light 37 internally reflected in the light guide 32 to cause the illumination light 37 to be uniformly output from the exit surface 35.

Figure 3:
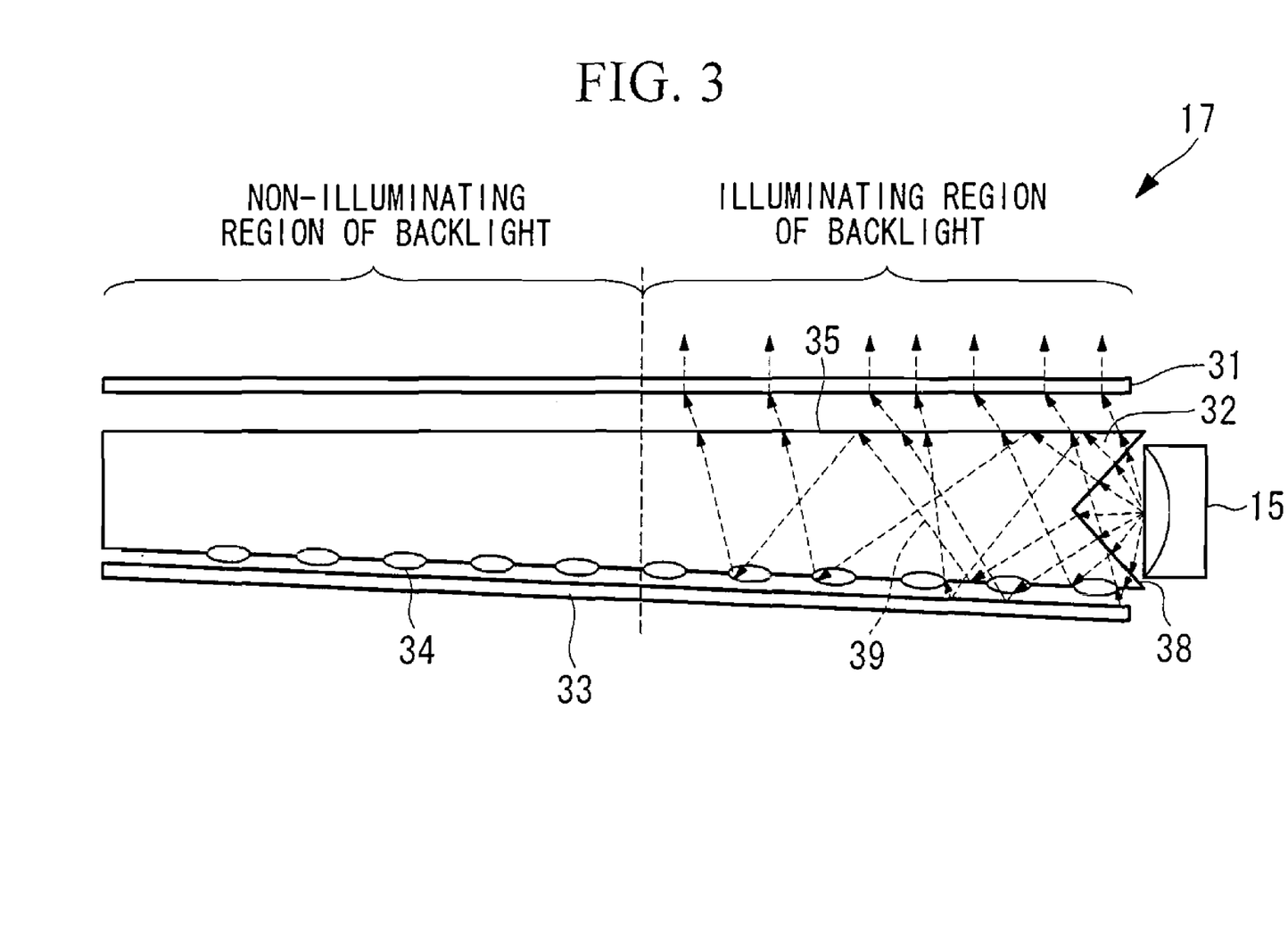
FIG. 3 illustrates the incidence conditions of illumination light emitted from a partial-illumination LED shown in FIG. 1.

As shown in FIG. 3, in addition to the above-described components, the light guide unit 17 also includes a second incidence surface 38 that receives illumination light 39 emitted from the partial-illumination LED 15. The second incidence surface 38 is tapered such that its distance from the partial-illumination LED 15 gradually increases towards the center of the second incidence surface 38. By giving the second incidence surface 38 this shape, the angle of refraction of the illumination light 39 at the second incidence surface 38 can be made greater than the angle of refraction of the illumination light 37 at the first incidence surface 36. Thus, the diffusion range of the illumination light 39 within the light guide 32 is reduced, whereby the illumination light 39 can be optically guided to a predetermined region of the liquid crystal display 11.

The switch button 21 can be operated by the user for switching the size of the image displayed on the liquid crystal display 11 between a normal size and a reduced size.

When the normal size is selected by means of the switch button 21, the liquid-crystal-panel signal controller 19 displays a normal-size image over the entire liquid crystal display 11. On the other hand, when the reduced size is selected by means of the switch button 21, the liquid-crystal-panel signal controller 19 reduces the size of the image based on a preset reduction ratio and displays the reduced image at a predetermined location on the liquid crystal display 11.

The liquid-crystal-panel signal controller 19 switches the size of the image displayed on the liquid crystal display 11 to the normal size or the reduced size on the basis of the illuminance of external light detected by the external-light illuminance sensor 23, the luminance of the liquid crystal display 11 detected by the TFT internal sensor 25, or the remaining power in the battery detected by the remaining-power sensor 27.

Figure 7A:
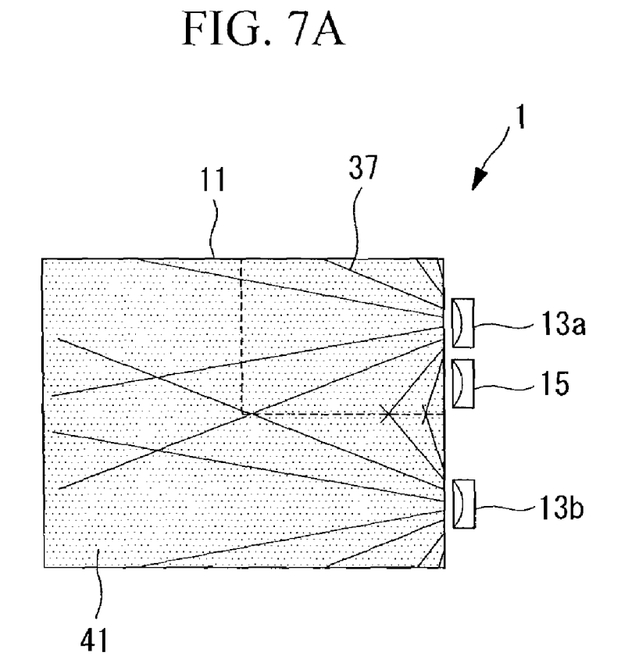
FIGS. 7A and 7B illustrate an illuminated state of a liquid crystal display shown in FIG. 1, FIG. 7A illustrating a full illumination mode and FIG. 7B illustrating a partial illumination mode.
Figure 7B:
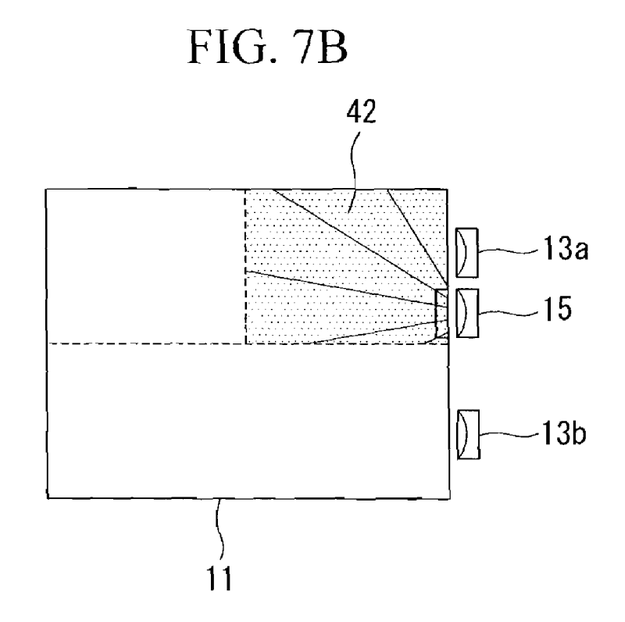
Figure 12A:
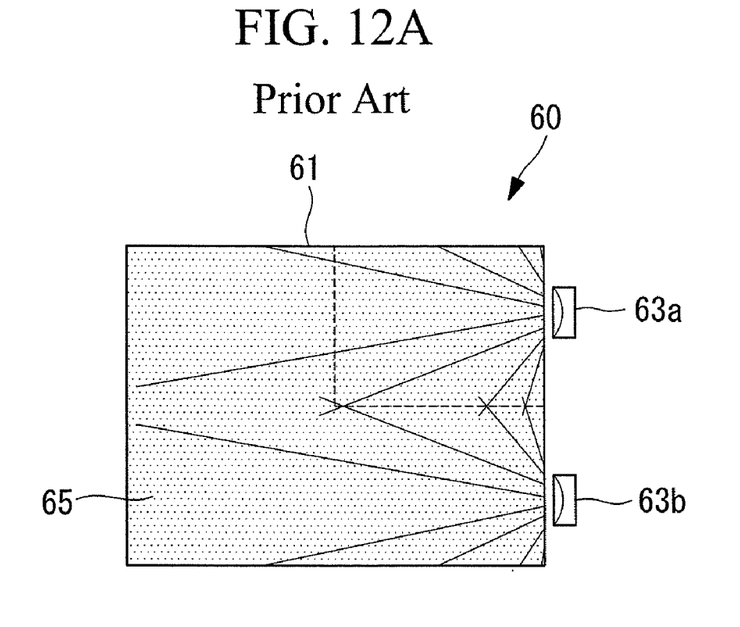
FIGS. 12A and 12B illustrate an illuminated state of a liquid crystal display of the related art, FIG. 12A illustrating a full illumination mode and FIG. 12B illustrating a partial illumination mode.
Figure 12B:
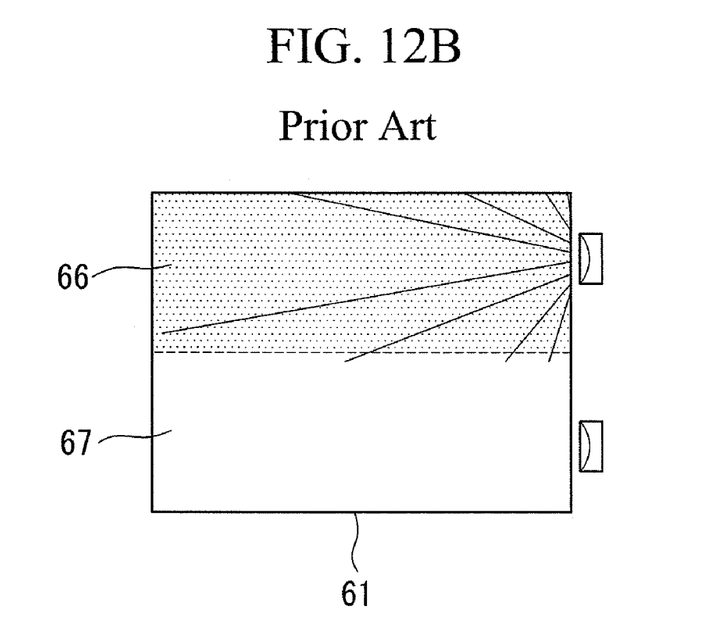

A full illumination method and a partial illumination method performed in the digital camera 1 having the above configuration will be described below with reference to FIGS. 7A and 7B and FIGS. 12A and 12B. FIGS. 7A and 7B illustrate the digital camera 1 according to this embodiment, whereas FIGS. 12A and 12B illustrate a digital camera 60 of the related art as a comparative example. FIGS. 7A and 12A show a full illumination mode, whereas FIGS. 7B and 12B show a partial illumination mode.

As shown in FIGS. 12A and 12B, the digital camera 60 of the related art includes a liquid crystal display 61 divided into two regions, and LEDs 63a and 63b arranged beside the liquid crystal display 61 and configured to illuminate the liquid crystal display 61 from the back thereof.

In the full illumination mode, as shown in FIG. 12A, the LED 63a and the LED 63b are both turned on so as to illuminate an entire region 65 of the liquid crystal display 61.

In the partial illumination mode, as shown in FIG. 12B, the LED 63a illuminates a partial region 66 of the liquid crystal display 61, or the LED 63b illuminates a partial region 67 of the liquid crystal display 61. In this case, minute optical patterns mentioned above are provided so that the illumination light can be uniformly output from the exit surface. Therefore, when either the LED 63a or the LED 63b is turned on, the partial region 66 or 67 having an aspect ratio different from that of the liquid crystal display 61 is illuminated.

In contrast, as shown in FIGS. 7A and 7B, the digital camera 1 according to this embodiment includes the liquid crystal display 11, normal-illumination LEDs 13a and 13b arranged beside the liquid crystal display 11, and the partial-illumination LED 15 disposed beside the liquid crystal display 11.

In the full illumination mode, as shown in FIG. 7A, the normal-illumination LEDs 13a and 13b are turned on, whereas the partial-illumination LED 15 is turned off.

In the partial illumination mode, as shown in FIG. 7B, the partial-illumination LED 15 is turned on, whereas the normal-illumination LEDs 13a and 13b are turned off. In this case, the illumination light received by the light guide 32 from the partial-illumination LED 15 is output only to a predetermined region 42. The predetermined region 42 has the same aspect ratio as the liquid crystal display 11 and has an area equal to a quarter of the area of an entire region 41 of the liquid crystal display 11. The normal-illumination LEDs 13 and the partial-illumination LED 15 have the same level of luminance.

According to the digital camera 1 that performs on/off control of the LEDs in the above-described manner, only one LED (i.e., the partial-illumination LED 15) needs to be turned on for the partial illumination mode, thereby reducing the power consumption to half of that in the full illumination mode in which two LEDs (i.e., the normal-illumination LEDs 13a and 13b) are turned on. In addition, since the illumination light from the partial-illumination LED 15 is collected in the predetermined region 42, which has an area half of that of the partial region 66 in FIG. 12B, the luminance of the predetermined region 42 is twice the luminance thereof in the full illumination mode. In other words, the partial illumination mode allows the power consumption of the LEDs to be reduced to a quarter of that in the full illumination mode, and the luminance of the predetermined region 42 to be doubled.

The operation of the digital camera 1 will be described below with reference to a flow chart shown in FIG. 11.

Figure 10A:
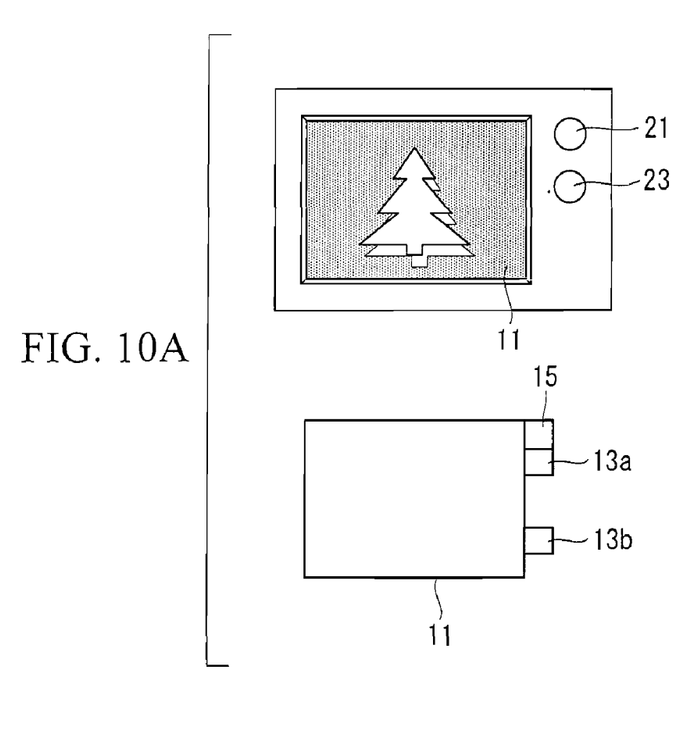
FIGS. 10A and 10B illustrate the operation of the digital camera shown in FIG. 1, FIG. 10A showing a state where a normal image is displayed and FIG. 10B showing a state where a reduced image is displayed.

First, by switching on the power of the digital camera 1, the normal-illumination LEDs 13a and 13b are turned on to fully illuminate the liquid crystal display 11, and a normal-size image is displayed on the liquid crystal display 11 in step S1. This state is shown in FIG. 10A.

Then, in step S2, the user may determine whether the image displayed on the liquid crystal display 11 has good visibility. If the image displayed has poor visibility, the user may operate the switch button 21 to switch to an outdoor mode in step S4.

On the other hand, in step S3, the user may determine whether there is sufficient power in the battery for taking a desired number of pictures or for shooting for a desired length of time. If there is little power remaining in the battery, the user may operate the switch button 21 in step S4 to switch to a power-saving mode.

In step S5, the remaining-power sensor 27 detects the power remaining in the battery. If there is little power remaining in the battery, the system controller 29 automatically switches to a power-saving mode (i.e., an automatic power-saving mode).

When switched to the outdoor mode, the power-saving mode, or the automatic power-saving mode, the illumination mode of the backlight is switched to the partial illumination mode in step S6. Specifically, the normal-illumination LEDs 13a and 13b are turned off, whereas the partial-illumination LED 15 is turned on by adjusting the drive current for the partial-illumination LED 15 using the LED driver 16.

Figure 10B:
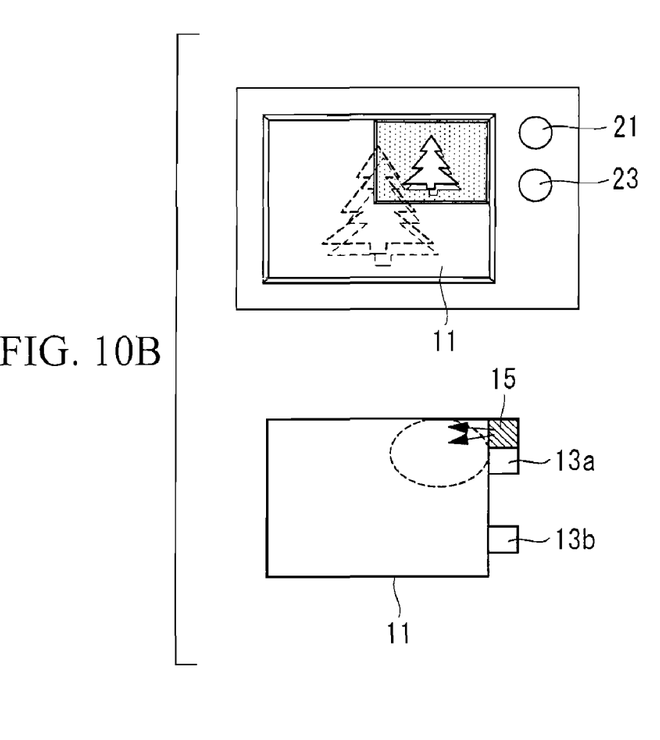

In step S7, the liquid-crystal-panel signal controller 19 reduces the size of the image displayed on the liquid crystal display 11 based on a preset reduction ratio and displays the reduced image in the predetermined region 42 illuminated by the partial-illumination LED 15. This state is shown in FIG. 10B.

In step S8, the display setting of the liquid crystal display 11 is completed.

As described above, in the digital camera 1 according to this embodiment, a normal-size image can be displayed over the entire liquid crystal display 11 with full illumination, and a reduced-size image can be displayed in the predetermined region 42, which has the same aspect ratio as the liquid crystal display 11, with partial illumination so as to reduce the power consumption.

Although the normal-illumination LEDs 13a and 13b and the partial-illumination LED 15 are described above as having the same level of luminance, the invention is not limited to this example. The predetermined region 42 can be made brighter during the partial illumination mode than during the full illumination mode so long as the ratio of the predetermined region 42 to the region illuminated by the normal-illumination LEDs 13a and 13b is smaller than the ratio of the luminance of the partial-illumination LED 15 to the luminance of the normal-illumination LEDs 13a and 13b.

For example, if the drive current for each LED is set such that the power consumption is the same between the full illumination mode and the partial illumination mode, the luminance of the partial-illumination LED 15 becomes twice as high as the luminance of the normal-illumination LED 13a or 13b. Since illumination light emitted from this partial-illumination LED 15 is collected in the predetermined region 42, which has an area half of that of the partial region 66 in FIG. 12B, the luminance of the predetermined region 42 is four times higher than the luminance thereof in the full illumination mode. Consequently, the visibility of the liquid crystal display 11 in the partial illumination mode can be further improved.

Although the second incidence surface 38 is described above as being tapered such that its distance from the partial-illumination LED 15 gradually increases towards the center thereof, the second incidence surface 38 is not limited to this shape. The second incidence surface 38 may have an alternative shape so long as it is recessed relative to the partial-illumination LED 15.

Figure 4:
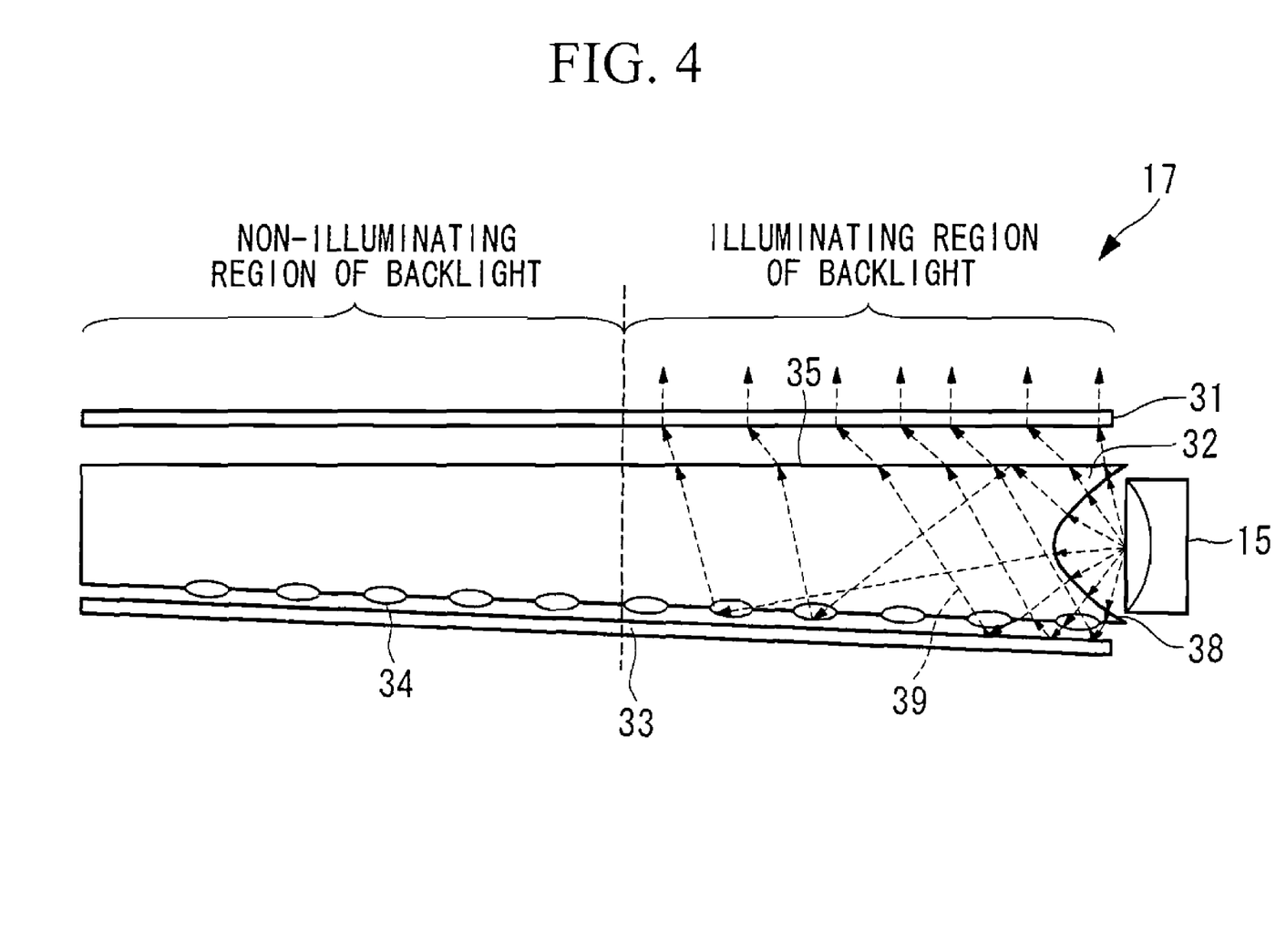
FIG. 4 illustrates a modification of a light guide unit shown in FIG. 3.
Figure 5:
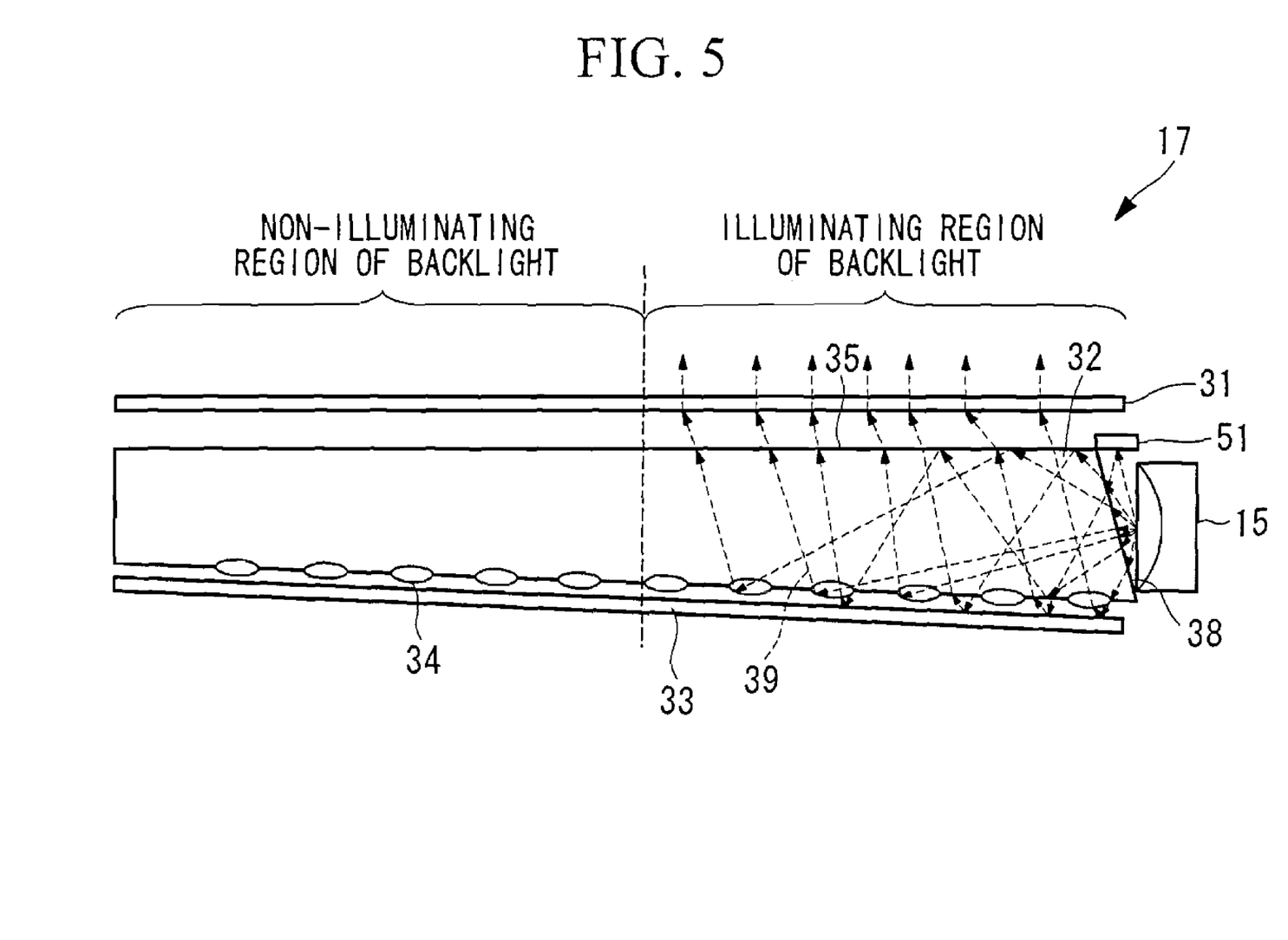
FIG. 5 illustrates another modification of the light guide unit shown in FIG. 3.

For example, as shown in FIG. 4, the second incidence surface 38 may be curved such that its distance from the partial-illumination LED 15 gradually increases towards the center thereof. As another alternative, the second incidence surface 38 may be tapered such that its distance from the partial-illumination LED 15 gradually increases towards the exit surface 35, and a reflector 51 may be provided near the partial-illumination LED 15 so as to face the reflector 33, as shown in FIG. 5. As a further alternative, the second incidence surface 38 may be tapered such that its distance from the partial-illumination LED 15 gradually increases with increasing distance from the exit surface 35, and the reflector 51 may be provided near the partial-illumination LED 15 so as to face the optical sheet 31, as shown in FIG. 6.

Figure 6:
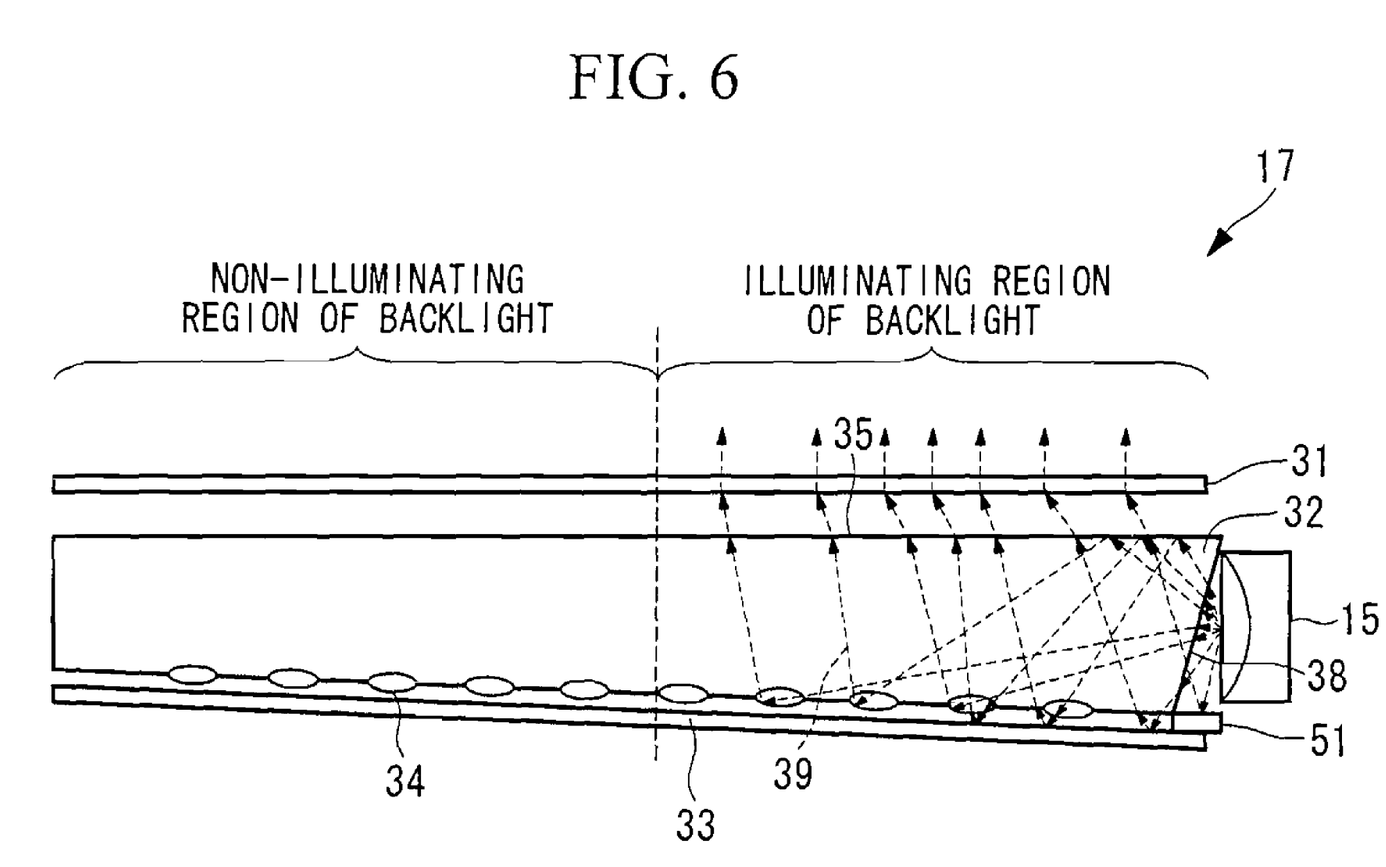
FIG. 6 illustrates another modification of the light guide unit shown in FIG. 3.

By giving the second incidence surface 38 one of the shapes shown in FIGS. 4, 5, and 6, the angle of refraction of the illumination light 39 emitted from the partial-illumination LED 15 can be increased, and the diffusion range of the illumination light 39 within the light guide 32 can be reduced, whereby the illumination light 39 can be optically guided to the predetermined region of the liquid crystal display 11.

Figure 11:
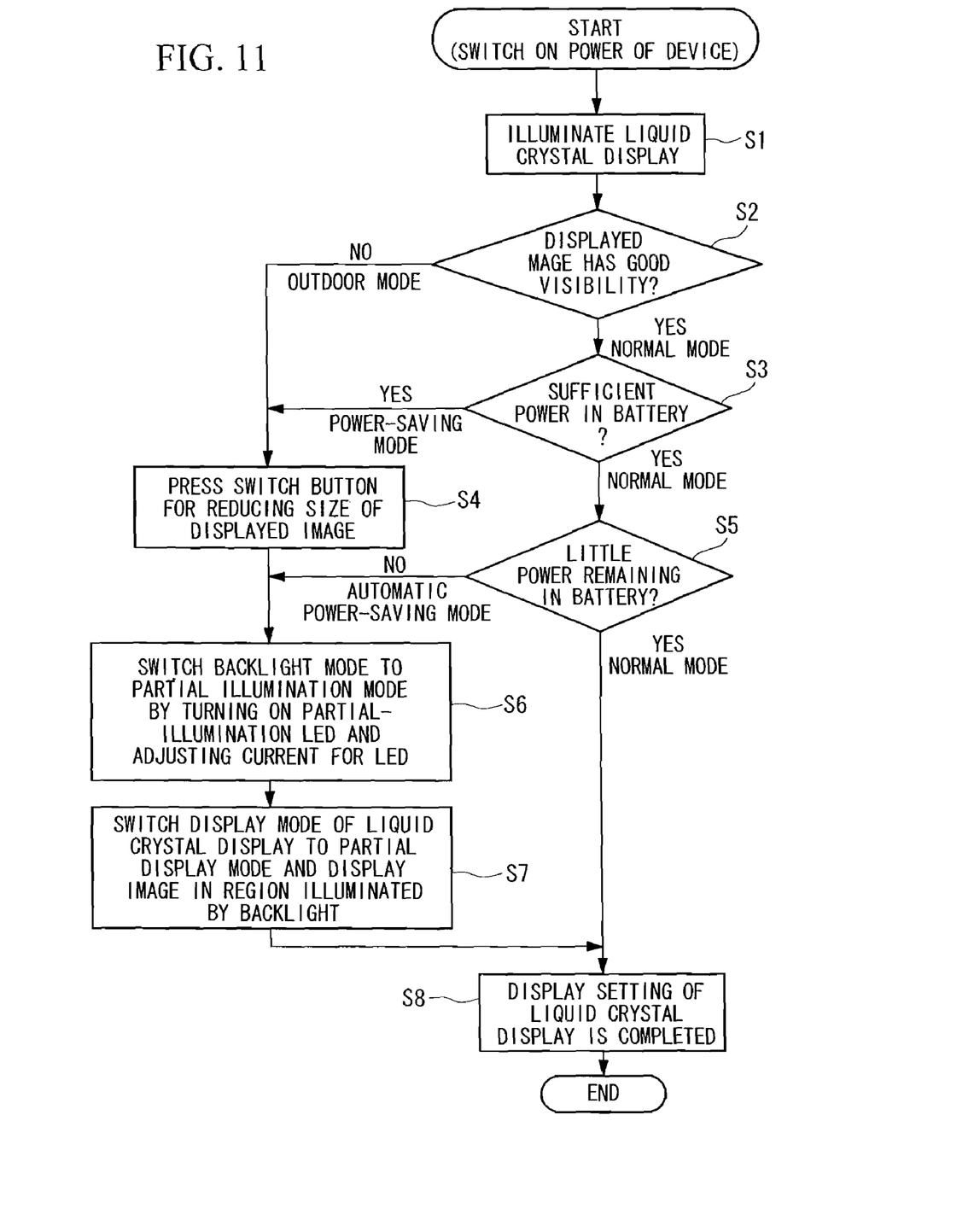
FIG. 11 is a flow chart illustrating processing performed in the digital camera shown in FIG. 1.

In the flow chart shown in FIG. 11, the determination of whether to switch to the outdoor mode may be performed automatically on the basis of the luminance of the liquid crystal display 11 detected by the TFT internal sensor 25. If the image displayed on the liquid crystal display 11 is a simple image that is sufficiently viewable, such as a text image or a low-resolution image, the user may operate the switch button 21 so as to cause the liquid crystal display 11 to display a reduced version of the image.

First Modification

A first modification of the above-described digital camera 1 will now be described with reference to FIGS. 8A and 8B.

Figure 8A:
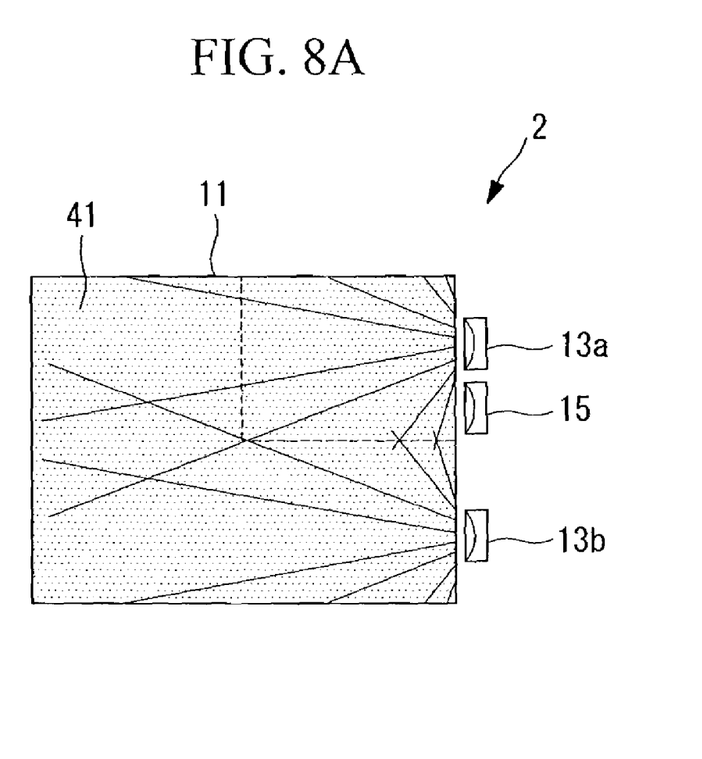
FIGS. 8A and 8B illustrate an illuminated state of a liquid crystal display according to a first modification, FIG. 8A illustrating a full illumination mode and FIG. 8B illustrating a partial illumination mode.
Figure 8B:
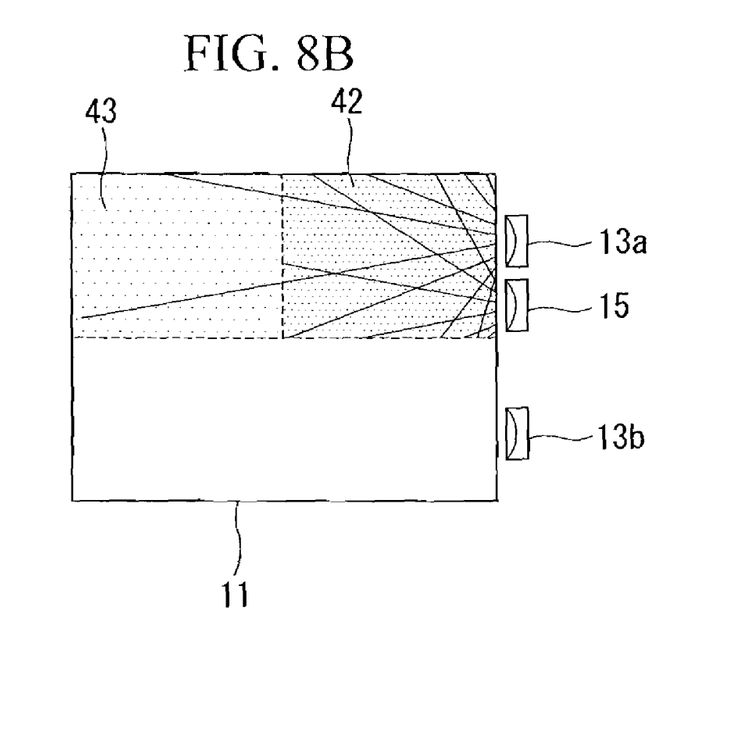

FIGS. 8A and 8B illustrate a full illumination method and a partial illumination method performed in a digital camera 2 according to this modification.

The digital camera 2 according to this modification has a configuration similar to that of the digital camera 1, but differs from the digital camera 1 in the control method of the partial illumination mode. Specifically, as shown in FIG. 8B, when in the partial illumination mode, the digital camera 2 according to this embodiment turns on the normal-illumination LED 13a and the partial-illumination LED 15 and turns off only the normal-illumination LED 13b. In this case, illumination light received by the light guide 32 from the partial-illumination LED 15 is output only to the predetermined region 42. On the other hand, illumination light received by the light guide 32 from the normal-illumination LED 13a is output to the predetermined region 42 and a partial region 43. The control method of the full illumination mode is the same as that in the digital camera 1.

In the digital camera 2, if the normal-illumination LEDs 13a and 13b and the partial-illumination LED 15 have the same level of luminance, the power consumption is the same between the partial illumination mode and the full illumination mode because the number of LEDs turned on is the same between the two modes. However, since half of the illumination light emitted from the normal-illumination LED 13a is output to the predetermined region 42 and the illumination light emitted from the partial-illumination LED 15 is entirely collected in the predetermined region 42, the luminance of the predetermined region 42 can be made three times higher than the luminance thereof in the full illumination mode.

Second Modification

Figure 9A:
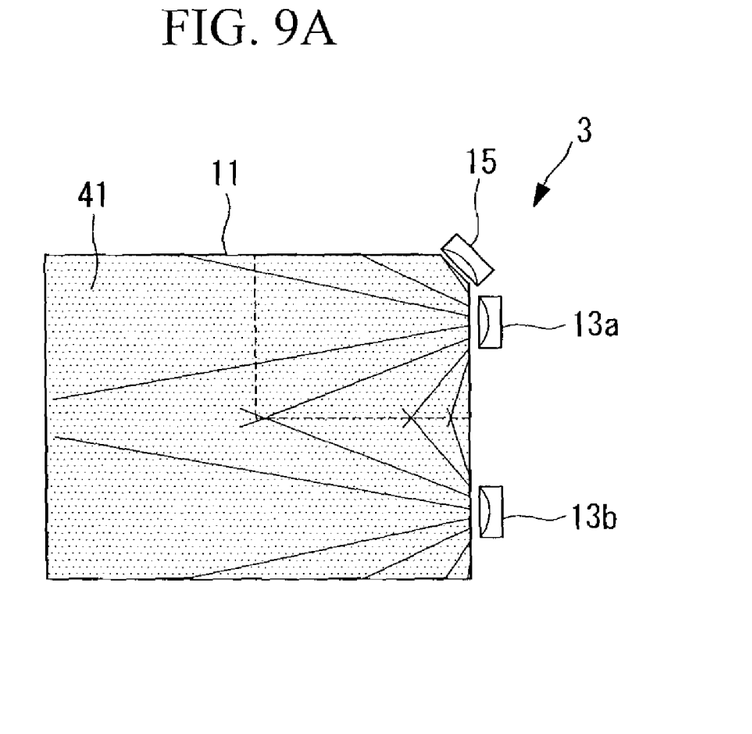
FIGS. 9A and 9B illustrate an illuminated state of a liquid crystal display according to a second modification, FIG. 9A illustrating a full illumination mode and FIG. 9B illustrating a partial illumination mode.
Figure 9B:
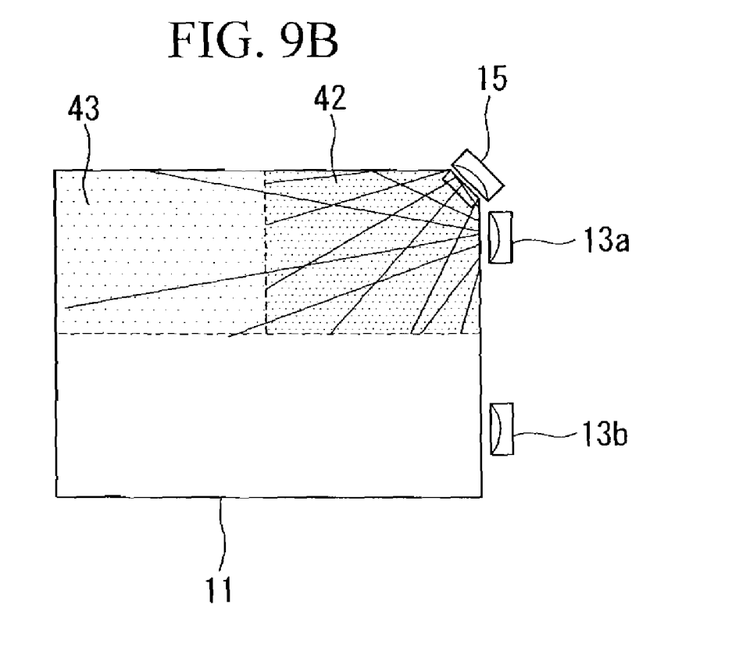

As a second modification of the digital camera 1 or the digital camera 2, the partial-illumination LED 15 may be disposed in a corner of the liquid crystal display 11, as shown in FIGS. 9A and 9B.

A digital camera 3 having such a configuration can achieve the same advantages as the digital camera 1 or the digital camera 2 and can also allow for an increased freedom when installing the LEDs.

Although the embodiment of the present invention has been described above in detail with reference to the drawings, specific configurations are not to be limited to those in the above embodiment, and various design modifications are permissible so long as they do not depart from the scope of the invention.

For example, although the display screen is the liquid crystal display 11 in the above description, the display screen may alternatively be, for example, a plasma display, an organic electroluminescence display, a field emission display, electronic paper, a cathode-ray tube display, or a light-emitting diode display.

Although a digital camera is described above as an example to which the display device according to the present invention is applied, the display device according to the present invention may alternatively be applied to any electronic apparatus having a display function, such as a portable phone or a personal digital assistant (PDA).

Although the liquid-crystal-panel signal controller 19 is configured to reduce the size of an image based on a preset reduction ratio in the above description, the liquid-crystal-panel signal controller 19 may alternatively be configured to enlarge an image based on a preset enlargement ratio. In that case, the enlarged image may be displayed during the full illumination mode, and the pre-enlarged image may be displayed during the partial illumination mode.

Although the predetermined region 42, which is illuminated during the partial illumination mode, has an area equal to a quarter of the area of the entire region 41 of the liquid crystal display 11 in the above description, it is not limited to this example. The predetermined region 42 may alternatively have an area equal to, for example, a half or an eighth of the area of the entire region 41 so long as the predetermined region 42 has the same aspect ratio as the liquid crystal display 11. Furthermore, the aspect ratio of a reduced image does not necessarily need to be exactly the same as the aspect ratio of a pre-reduced image, and may be a ratio that can provide a sufficiently viewable version of the pre-reduced image.

What is claimed is:

1. A display device comprising:
   a display screen configured to display an image;
   a first light source configured to emit illumination light and a second light source configured to emit illumination light;
   a light guide unit having a first incidence surface that receives the illumination light emitted from the first light source and a second incidence surface that receives the illumination light emitted from the second light source, the light guide unit being configured to optically guide the illumination light received by the first incidence surface to an entire surface of the display screen and to optically guide the illumination light received by the second incidence surface to a predetermined region having the same aspect ratio as the display screen; and
   an image switching unit configured to switch a size of the image displayed on the display screen to a size corresponding to the entire surface or a size corresponding to the predetermined region.

2. The display device according to claim 1, wherein the second incidence surface has a recessed shape.

3. The display device according to claim 1, wherein a ratio of the predetermined region to the display screen is smaller than a ratio of the luminance of the second light source to the luminance of the first light source.

4. The display device according to claim 1, further comprising:
   an external-light detector configured to detect an intensity of external light; and
   a lighting controller configured to perform on/off control of the first light source and the second light source on the basis of the intensity of external light detected by the external-light detector.

5. An electronic apparatus comprising:
   a display device according to claim 1;
   an image-acquisition device configured to acquire an image of a subject; and
   a display controller configured to display the image acquired by the image-acquisition device on the display device.

* * * * *